United States Patent
Higuchi

(10) Patent No.: US 8,913,555 B2
(45) Date of Patent: Dec. 16, 2014

(54) RADIO RELAY STATION APPARATUS, RADIO BASE STATION APPARATUS AND TRANSMISSION POWER CONTROL METHOD

(75) Inventor: Kenichi Higuchi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 343 days.

(21) Appl. No.: 13/521,455

(22) PCT Filed: Jan. 13, 2011

(86) PCT No.: PCT/JP2011/050406
§ 371 (c)(1),
(2), (4) Date: Aug. 2, 2012

(87) PCT Pub. No.: WO2011/087040
PCT Pub. Date: Jul. 21, 2011

(65) Prior Publication Data
US 2012/0300695 A1  Nov. 29, 2012

(30) Foreign Application Priority Data
Jan. 13, 2010 (JP) ................................. 2010-004878

(51) Int. Cl.
*H04W 4/00* (2009.01)
*H04B 7/155* (2006.01)
*H04W 52/46* (2009.01)
*H04W 84/04* (2009.01)

(52) U.S. Cl.
CPC ......... *H04B 7/15535* (2013.01); *H04W 84/047* (2013.01); *H04W 52/46* (2013.01)
USPC ........................................................ 370/328

(58) Field of Classification Search
CPC ........ H04B 7/14; H04B 7/15; H04B 7/15507; H04B 7/15535; H04B 7/026
USPC .................... 370/254, 315, 328, 342
See application file for complete search history.

(56) References Cited

U.S. PATENT DOCUMENTS

| 2004/0242154 A1 | 12/2004 | Takeda et al. |
| 2005/0259726 A1* | 11/2005 | Farjad-rad ................... 375/232 |

(Continued)

FOREIGN PATENT DOCUMENTS

| JP | 3811491 B2 | 8/2006 |
| JP | 2009-177628 A | 8/2009 |

OTHER PUBLICATIONS

Notification of Reasons for Rejection for Japanese Application No. 2010-004878 dated Jan. 22, 2013, with English translation thereof (5 pages).

(Continued)

*Primary Examiner* — Raj Jain
(74) *Attorney, Agent, or Firm* — Osha Liang LLP

(57) ABSTRACT

A radio relay station apparatus has a receiving section configured to receive a downlink signal including relay information as to whether or not a mobile terminal apparatus performs relay transmission, a relay amplification factor control section configured to control a relay amplification factor when performing the relay transmission when the relay information is information indicating that the relay transmission is performed, and a transmitting section configured to transmit an uplink signal amplified at the controlled relay amplification factor. The relay amplification factor control section controls the relay amplification factor so that a power density of a signal from the mobile terminal apparatus received at a radio base station apparatus via the radio relay station apparatus becomes substantially equal to a case where the mobile terminal apparatus exists at a position of the radio relay station apparatus and performs transmission without relay transmission.

8 Claims, 6 Drawing Sheets

(56) References Cited

U.S. PATENT DOCUMENTS

2006/0100860 A1* 5/2006 Oppelt .................... 704/201
2009/0092072 A1* 4/2009 Imamura et al. ............. 370/315
2010/0304665 A1 12/2010 Higuchi
2012/0300695 A1* 11/2012 Higuchi .................... 370/315

OTHER PUBLICATIONS

International Search Report w/translation from PCT/JP2011/050406 dated Mar. 8, 2011 (4 pages).

* cited by examiner

DOWNLINK BS·RS SPECIFIC REFERENCE SIGNAL

← DESIRED WAVE
←----- INTERFERENCE WAVE

RADIO RELAY STATION APPARATUS, RADIO BASE STATION APPARATUS AND TRANSMISSION POWER CONTROL METHOD

TECHNICAL FIELD

The present invention relates to a radio relay station apparatus, a radio base station apparatus and a transmission power control method that perform adaptive AF (Amplify-and-Forward) type relay transmission.

BACKGROUND ART

In the ITU-R (International Telecommunication Union-Radio Communication Sector), fourth generation mobile communication systems called "IMT-Advanced (International Mobile Telecommunications-Advanced)" are required to support extremely high data rates compared to current third generation mobile communication systems. A reduction of coverage caused by constraints on transmission power in transmission from mobile terminal apparatuses in particular becomes a technical problem in realizing such high data rates.

Relay transmission is becoming a focus of attention in recent years as a technique for realizing high-speed radio transmission with wide coverage in a power-constrained environment. Relay transmission can be roughly divided into an AF (Amplify-and-Forward) type that amplifies without demodulation and transfers a reception RF (Radio Frequency) signal and a DF (Decode-and-Forward) type in which a radio relay station apparatus demodulates/decodes a received signal to be relayed, re-codes/re-modulates the decision data and transfers the data.

The AF type relay transmission has an advantage that a transmission delay time required for relay transfer is small, but a radio relay station apparatus amplifies and transfers noise and an interference component included in a received signal as well as a desired signal component, resulting in a problem that inter-cell interference increases in cellular communication. Furthermore, since relay transmission generally requires part of a communication band to be allocated to a relay signal, frequency utilization efficiency deteriorates.

Thus, the present inventor previously proposed an adaptive AF type relay transmission method that controls whether or not to apply relay transmission in two stages based on the magnitude of path loss between a mobile terminal apparatus and a radio base station apparatus, and between the mobile terminal apparatus and each radio relay station apparatus, and controls which radio relay station apparatus should be used to perform relay transmission (Non-Patent Literature 1, Patent Literature 1).

CITATION LIST

Patent Literature

Patent Literature 1: Japanese Patent Application Laid-Open No.2009-177628

Non-Patent Literature

Non-Patent Literature 1: Haruaki Machida, Kenichi Higuchi: "A study on adaptive Amplify-and-Forward type relay transmission method suitable for cellular communication," 2008, IEICE General Conference, B-5-92, March 2008.

SUMMARY OF INVENTION

Technical Problem

By turning OFF relay transmission to a mobile terminal apparatus in the vicinity of a radio base station apparatus and turning ON only radio relay station apparatuses located at a short distance from the mobile terminal apparatus when performing relay transmission, this adaptive AF type relay transmission method solves the problems with unnecessary deterioration of frequency utilization efficiency caused by relay transmission and amplification of other cell interference. Even using this adaptive AF type relay transmission method, the user throughput characteristic that can be realized is highly dependent on the amount of inter-cell interference.

The present invention has been implemented in view of the above problems, and it is an object of the present invention to provide a radio relay station apparatus, a radio base station apparatus and a transmission power control method capable of improving user throughput characteristics using an adaptive AF type relay transmission method.

Solution to Problem

A transmission power control method according to the present invention includes a step of receiving a downlink signal including relay information as to whether or not a mobile terminal apparatus performs relay transmission, a step of controlling, when the relay information is information indicating that the relay transmission is performed, a relay amplification factor when performing the relay transmission, and a step of transmitting an uplink signal amplified at the controlled relay amplification factor, wherein the relay amplification factor is controlled so that a power density of a signal from the mobile terminal apparatus received at a radio base station apparatus via a radio relay station apparatus becomes substantially equal to that in the case where the mobile terminal apparatus exists at the position of the radio relay station apparatus and performs transmission without relay transmission.

A transmission power control method according to the present invention includes a step of receiving a downlink signal including relay information as to whether or not a mobile terminal apparatus performs relay transmission, a step of controlling, when the relay information is information indicating that the relay transmission is performed, a relay amplification factor when performing the relay transmission, and a step of transmitting an uplink signal amplified at the controlled relay amplification factor, wherein the relay amplification factor is controlled so that a power density of a signal from the mobile terminal apparatus received at a radio base station apparatus via a radio relay station apparatus becomes substantially equal to that in the case where transmission is performed without relay transmission.

Technical Advantages of the Invention

According to the present invention, it is possible to improve user throughput characteristics using an adaptive AF type relay transmission method.

DESCRIPTION OF EMBODIMENTS

Hereinafter, embodiments of the present invention will be described in detail with reference to the accompanying drawings. Transmission power control (TPC) is an approach to reduce inter-cell interference. A radio interface based on a next-generation mobile communication scheme called "Evolved UTRA" (UMTS Terrestrial Radio Access) and "UTRAN" (UMTS Terrestrial Radio Access Network) for which 3GPP (3rd Generation Partnership Project) is carrying forward standardization (also called "LTE" (Long-Term Evolution)) applies fractional TPC that compensates for only part of average path loss, moderately suppresses inter-cell interference and thereby realizes improvement of throughput of an entire cell.

Here, fractional TPC will be described.

Transmission power of signals transmitted on an uplink of an LTE system (PUSCH (Physical Uplink Shared Channel), PUSCH (Physical Uplink Control Channel), SRS (Sounding Reference Signal)) is controlled in combination with open-loop control according to parameters reported by a radio base station apparatus in a relatively long cycle and propagation loss measured by a mobile terminal apparatus and closed-loop control by a TPC command reported by the radio base station apparatus in a relatively short cycle based on a communication situation between the radio base station apparatus and the mobile terminal apparatus (e.g., reception SINR (Signal to Interference plus Noise Power Ratio) at the radio base station apparatus). To be more specific, transmission power of PUSCH is given by following equation (3).

$$P_{PUSCH}(i) = \min\{P_{MAX}, 10\log_{10}(M_{PUSCH}(i)) + P_{O\_PUSCH}(j) + \alpha \cdot PL + \Delta_{TF}(i) + f(i)\}$$ Equation (3)

This fractional TPC sets target receiving power according to path loss PL between the radio base station apparatus and the mobile terminal apparatus (realized by parameter α of open-loop control), and can thereby reduce inter-cell interference.

Figure 3:
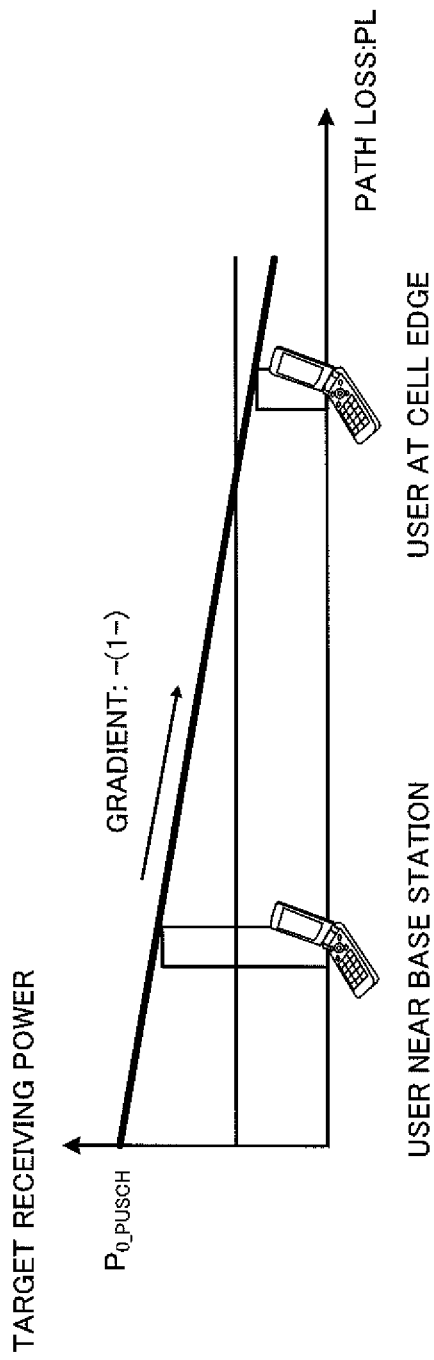
FIG. 3 is a diagram illustrating fractional transmission power control.

FIG. 3 is a diagram illustrating fractional TPC. In FIG. 3, the vertical axis represents target receiving power ($P_{O\_PUSCH}$) and the horizontal axis represents path loss (PL). For the purpose of suppressing inter-cell interference, the fractional TPC sets target receiving power of a mobile terminal apparatus located at a cell edge (user located at a cell edge) to be small. That is, when path loss (PL) is large, the user is assumed to be located at the cell edge and when path loss is small, the user is assumed to be located near the radio base station apparatus, and therefore the target receiving power of the mobile terminal apparatus of the user near the radio base station apparatus is set to be relatively large and the target receiving power of the mobile terminal apparatus of the user at the cell edge is set to be relatively small. The gradient of a primary characteristic line having such a relationship is $-(1-\alpha)$.

The present invention provides transmission power control during relay transmission based on fractional TPC for the adaptive AF type relay transmission suitable for cellular communication on an uplink proposed above. This makes it possible to improve average user throughput and user throughput of a mobile terminal apparatus located at a cell edge.

First, the adaptive AF type relay transmission method which is the premise for transmission power control according to the present invention will be described. The adaptive AF type relay transmission in a cellular environment proposed above by the present inventor alleviates the problems with amplification of other cell interference in conventional AF type relay transmission (repeater) and allocated time/frequency utilization efficiency loss accompanying relay transmission.

Figure 1:
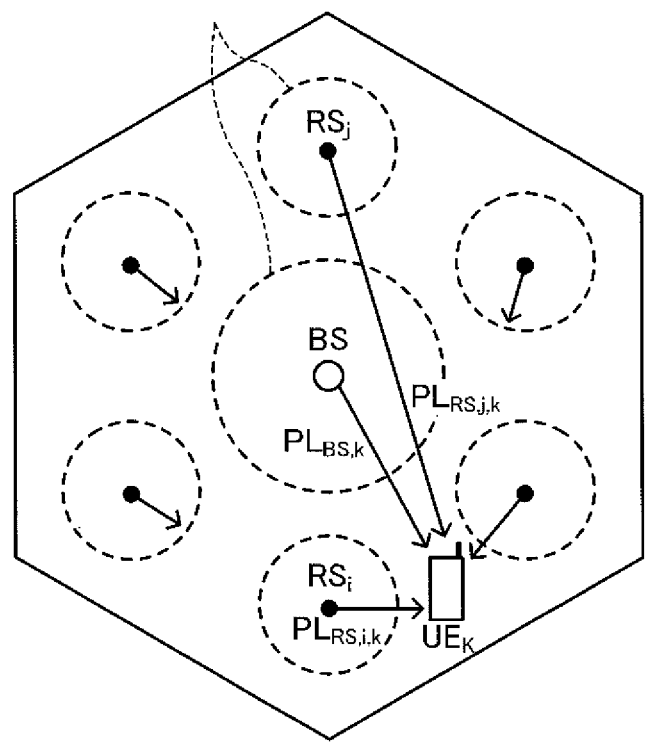
FIG. 1 is a diagram illustrating adaptive AF type relay transmission.

As shown in FIG. 1, in addition to a radio base station apparatus (BS), each radio relay station apparatus i (i=1, 2, ..., $N_{RS}$: $N_{RS}$ is the number of radio relay station apparatuses in a cell) transmits a specific downlink reference signal (downlink BS/RS-specific reference signal: pilot channel signal). A mobile terminal apparatus $UE_k$ measures amounts of path loss (distance attenuation+shadowing) $PL_{BS,k}$ and $PL_{RS,i,k}$ between the radio base station apparatus and each radio relay station apparatus using reference signals. The mobile terminal apparatus $UE_k$ periodically reports $PL_{BS,k}$ and $PL_{RS,i,k}$ to the radio base station apparatus. The radio base station apparatus adaptively selects a radio relay station apparatus to be used for transmission of the mobile terminal apparatus $UE_k$ using $PL_{BS,k}$ and $PL_{RS,i,k}$ in two steps.

In a first step, the radio base station apparatus selects whether or not to perform relay transmission to the mobile terminal apparatus $UE_k$ based on $PL_{BS,k}$. To be more specific, relay transmission is performed only when $PL_{BS,k}$ normalized by the amount of distance attenuation at the cell edge is greater than a predetermined threshold T. For example, threshold T=20 dB can be set. On the other hand, when relay transmission is not performed, all time/frequency resources allocated to the mobile terminal apparatus $UE_k$ are used for transmission of the mobile terminal apparatus. When relay transmission is performed, ½ of the allocation time is used for transmission of the radio relay station apparatus. When relay transmission is performed, a radio relay station apparatus to be used for relay transmission is further selected in a second step.

In the second step, the radio base station apparatus selects a radio relay station apparatus to be used for uplink transmission of the mobile terminal apparatus $UE_k$ based on $PL_{RS,i,k}$. To be more specific, only a radio relay station apparatus i that satisfies following equation (4) is used using a predetermined threshold Δ.

[Equation 1]

$$PL_{RS,i,k} \leq \min_{1 \leq j \leq N_{RS}} PL_{RS,j,k} + \Delta \text{ in dB}$$ Equation (4)

When relay transmission of a mobile terminal apparatus in the vicinity of the cell is canceled in the first step, time/frequency resources are thereby improved and the amount of amplification of other cell interference is reduced. Setting the amplification factor of a radio relay station apparatus which contributes less to an increase of receiving power of a desired mobile terminal apparatus to 0 in the second step further reduces the amount of amplification of other cell interference.

The radio base station apparatus reports the number of the radio relay station apparatus to be used for the mobile terminal apparatus $UE_k$ to all radio relay station apparatuses via a downlink control channel in advance. After that, the radio base station apparatus periodically determines allocation of uplink transmission to each mobile terminal apparatus based on a scheduler and reports the allocation to each mobile terminal apparatus using a downlink control signal. Each radio relay station apparatus in the cell also receives this scheduling information. When the mobile terminal apparatus does not perform relay transmission, all radio relay station apparatuses set their power amplification factors to 0. On the other hand, when the mobile terminal apparatus performs relay transmission, only the radio relay station apparatus selected for the mobile terminal apparatus in advance sets its power amplification factor to a value greater than 0 and the other radio relay station apparatuses set their power amplification factors to 0.

Next, transmission power control in the adaptive AF type relay transmission method according to the present invention will be described.

In the following description, suppose path loss between the mobile terminal apparatus and the radio base station apparatus is $PL_{UE\text{-}BS}$, path loss between the mobile terminal apparatus and the radio relay station apparatus is $PL_{UE\text{-}RS}$ and path loss between the radio relay station apparatus and the radio base station apparatus is $PL_{RS\text{-}BS}$ (all in dB values).

When the mobile terminal apparatus does not apply relay transmission, a transmission power density $P^{(no\ relay)}$ (dBm/Hz) of the mobile terminal apparatus is determined by equation (5) by applying fractional TPC defined in LTE.

$$P^{(no\ relay)} = T^{(no\ relay)} + P_{noise} + \alpha^{(no\ relay)} PL_{UE\text{-}BS} \quad \text{Equation (5)}$$

where, $T^{(no\ relay)}$ is a reference target reception SNR (Signal-to-Noise Power Ratio) when relay transmission is not performed, $P_{noise}$ is a noise power density of a receiver of the radio base station apparatus and $\alpha^{(no\ relay)}$ ($0<\alpha^{(no\ relay)}\leq 1$) is an attenuation coefficient of the fractional TPC when relay transmission is not performed. At this time, the power density of the signal received at the radio base station apparatus becomes as shown in equation (6).

$$R^{(no\ relay)} = P^{(no\ relay)} - PL_{UE\text{-}BS} \quad \text{Equation (6)}$$
$$= T^{(no\ relay)} + P_{noise} -$$
$$(1 - \alpha^{(no\ relay)})PL_{UE\text{-}BS}$$

In equation (6), when $\alpha^{(no\ relay)}$ becomes smaller than 1, the mobile terminal apparatus near the cell edge can no longer compensate for path loss and the received signal power density decreases, but the amount of interference with other cells also decreases.

On the other hand, when the mobile terminal apparatus performs relay transmission, the transmission power density $P^{(relay)}$ of the mobile terminal apparatus is determined by the fractional TPC in following equation (7).

$$P^{(relay)} = T^{(relay)} + P_{noise} + \alpha^{(relay)} PL_{UE\text{-}RS} \quad \text{Equation (7)}$$

where, $T^{(relay)}$ is a reference target reception SNR when relay transmission is performed and $\alpha^{(relay)}$ ($0<\alpha^{(relay)}\leq 1$) is an attenuation coefficient of the fractional TPC when relay transmission is performed. Here, the noise power density of the receiver of the radio relay station apparatus is assumed to be $P_{noise}$ identical to that of the radio base station apparatus. That is, when relay transmission is performed, the transmission power density of the mobile terminal apparatus is determined so as to partially compensate for path loss between the mobile terminal apparatus and the selected radio relay station apparatus.

When relay transmission is performed, the radio relay station apparatus amplifies the received signal at a certain power amplification factor, and the present invention provides two methods as the method of controlling the power amplification factor.

(1) RS-TPC Method 1

A first radio relay station apparatus power amplification factor control method (RS-TPC method 1) controls the power amplification factor of the radio relay station apparatus so that the power density of a signal from the mobile terminal apparatus that has performed the relay transmission received at the radio base station apparatus via the radio relay station apparatus becomes substantially equal to that in the case where the mobile terminal apparatus exists at the position of the radio relay station apparatus and performs transmission without relay transmission.

When the amplification factor in the radio relay station apparatus is assumed to be G, the power density of the signal of the mobile terminal apparatus received at the radio base station apparatus via the radio relay station apparatus is as shown in equation (8).

$$R^{(relay)} = G + P^{(relay)} - PL_{UE\text{-}RS} - PL_{RS\text{-}BS} \quad \text{Equation (8)}$$
$$= G + T^{(relay)} + P_{noise} -$$
$$(1 - \alpha^{(relay)})PL_{UE\text{-}RS} - PL_{RS\text{-}BS}$$

On the other hand, if the mobile terminal apparatus located at the position of the radio relay station apparatus performs transmission without relay transmission, the power density of the signal received at the radio base station apparatus is as shown in equation (9).

$$R_1^{(no\ relay)} = T^{(no\ relay)} + P_{noise} - (1 - \alpha^{(no\ relay)})PL_{RS\text{-}BS} \quad \text{Equation (9)}$$

Therefore, to realize $R^{(relay)} = R_1^{(no\ relay)}$, G is controlled according to equation (1).

$$G = T^{(no\ relay)} - T^{(relay)} + (1 - \alpha^{(relay)})PL_{UE\text{-}RS} + \alpha^{(no\ relay)} PL_{RS\text{-}BS} \quad \text{Equation (1)}$$

(2) RS-TPC Method 2

A second radio relay station apparatus power amplification factor control method (RS-TPC method 2) controls the power amplification factor of the radio relay station apparatus so that the power density of a signal from the mobile terminal apparatus that has performed the relay transmission received at the radio base station apparatus via the radio relay station apparatus becomes substantially equal to that just like in the case where transmission is performed without relay transmission.

If the mobile terminal apparatus that actually applies relay transmission is assumed to have not performed relay transmission, the power density of the signal received at the radio base station apparatus is as shown in equation (10).

$$R_2^{(no\ relay)} = T^{(no\ relay)} + P_{noise} - (1 - \alpha^{(no\ relay)})PL_{UE\text{-}BS} \quad \text{Equation (10)}$$

Therefore, to realize $R^{(relay)} = R_2^{(no\ relay)}$, G is controlled by equation (2).

$$G = T^{(no\ relay)} - T^{(relay)} + (1 - \alpha^{(relay)})PL_{UE\text{-}RS} -$$
$$(1 - \alpha^{(no\ relay)})PL_{UE\text{-}BS} + PL_{RS\text{-}BS} \quad \text{Equation (2)}$$

The power amplification factor control over these radio relay station apparatuses may be performed by the radio relay station apparatus or by the radio base station apparatus. When the radio relay station apparatus performs power amplification factor control, the parameters in equation (1) or equation (2) are acquired from the radio base station apparatus or mobile terminal apparatus as required. For example, path loss $PL_{UE\text{-}BS}$ of the RS-TPC method 2 may be acquired by signaling from the radio base station apparatus or acquired through a report from the mobile terminal apparatus. To be more specific, in the example of the former, the mobile terminal apparatus measures path loss $PL_{UE\text{-}BS}$, reports it to the radio base station apparatus directly or via the radio relay station apparatus and the radio base station apparatus reports parameters including path loss $PL_{UE\text{-}BS}$ to the radio relay station apparatus. In the example of the latter, the mobile terminal apparatus measures path loss $PL_{UE\text{-}BS}$ and reports it to the radio relay station apparatus. The radio relay station apparatus controls the power amplification factor of the radio relay station apparatus together with information of other parameters reported from the radio base station apparatus. A series of actions of such reporting and control is generally performed periodically in a long cycle or triggered by an instruction through a control signal from the radio base station apparatus or radio relay station apparatus. Furthermore, when $\alpha^{(no\ relay)}$ is 1, the RS-TPC method 1 is equivalent to the RS-TPC method 2.

Figure 2:
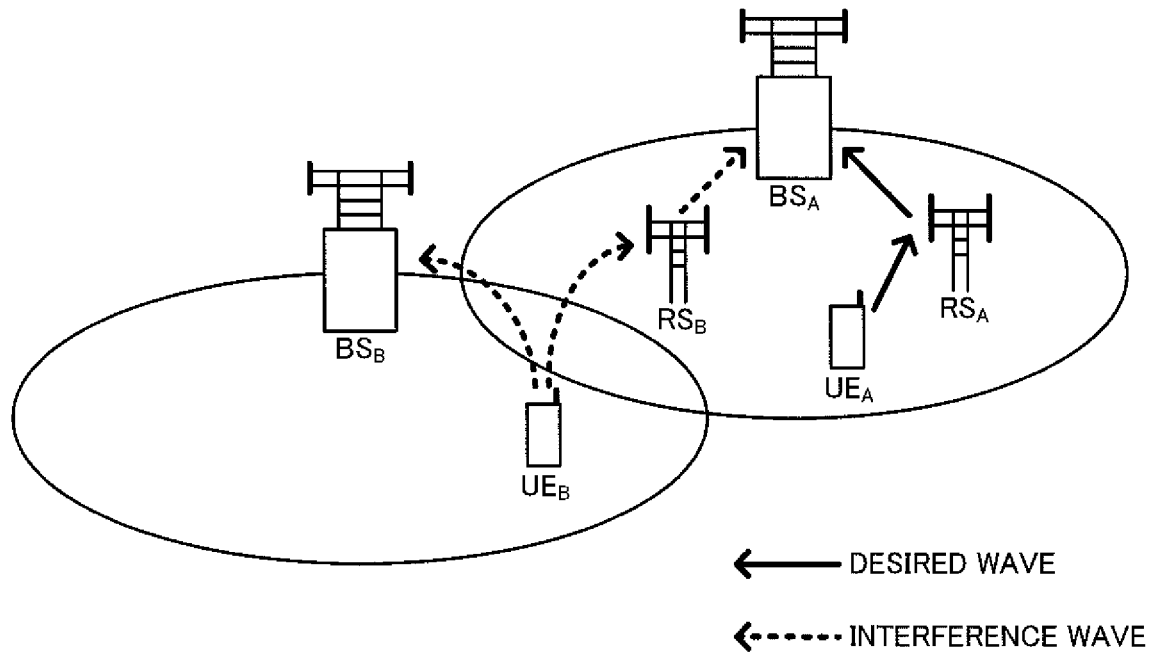
FIG. 2 is a diagram illustrating adaptive AF type relay transmission.

FIG. 2 is a conceptual diagram of a relay transmission system. In the relay transmission system, radio relay station apparatuses (RSs) exist in a cell in addition to a radio base station apparatus (BS:eNB) and a mobile terminal apparatus (UE). In FIG. 2, since a mobile terminal apparatus $UE_A$ is located at a cell edge, when $UE_A$ transmits an uplink signal directly to a radio base station apparatus $BS_A$ in the cell in which $UE_A$ is located, $UE_A$ may transmit the signal with stronger power than that of a mobile terminal apparatus in the vicinity of the radio base station apparatus $BS_A$. However, since a radio relay station apparatus $RS_A$ exists between the mobile terminal apparatus $UE_A$ and the radio base station apparatus $BS_A$, the uplink signal from the mobile terminal apparatus $UE_A$ is transmitted to the radio base station apparatus $BS_A$ via the radio relay station apparatus $RS_A$.

Therefore, when an uplink signal from the mobile terminal apparatus $UE_A$ is transmitted to the radio base station apparatus $BS_A$ via the radio relay station apparatus $RS_A$, the mobile terminal apparatus $UE_A$ needs only to transmit the uplink signal with a degree of power that reaches the radio relay station apparatus $RS_A$ which is located nearer to $UE_A$ than the radio base station apparatus $BS_A$, and therefore the transmission power of the mobile terminal apparatus $UE_A$ can be reduced. The radio relay station apparatus $RS_A$ may be a mobile terminal apparatus or a fixed station in terms of operation principles. Furthermore, unlike the radio base station apparatus, the radio relay station apparatus needs only to be provided with the function of relaying a signal, and can therefore be set up more simply and at lower cost than the radio base station apparatus. The relay transmission system is described, for example, in A. Nostatinia, T. E. Hunter, and A. Hedayat, "Cooperative Communication in Wireless Networks," IEEE Communications Magazine, Vol. 42, No. 10, pp. 74-80, October 2004, entire content of which is expressly incorporated herein.

Figure 4:
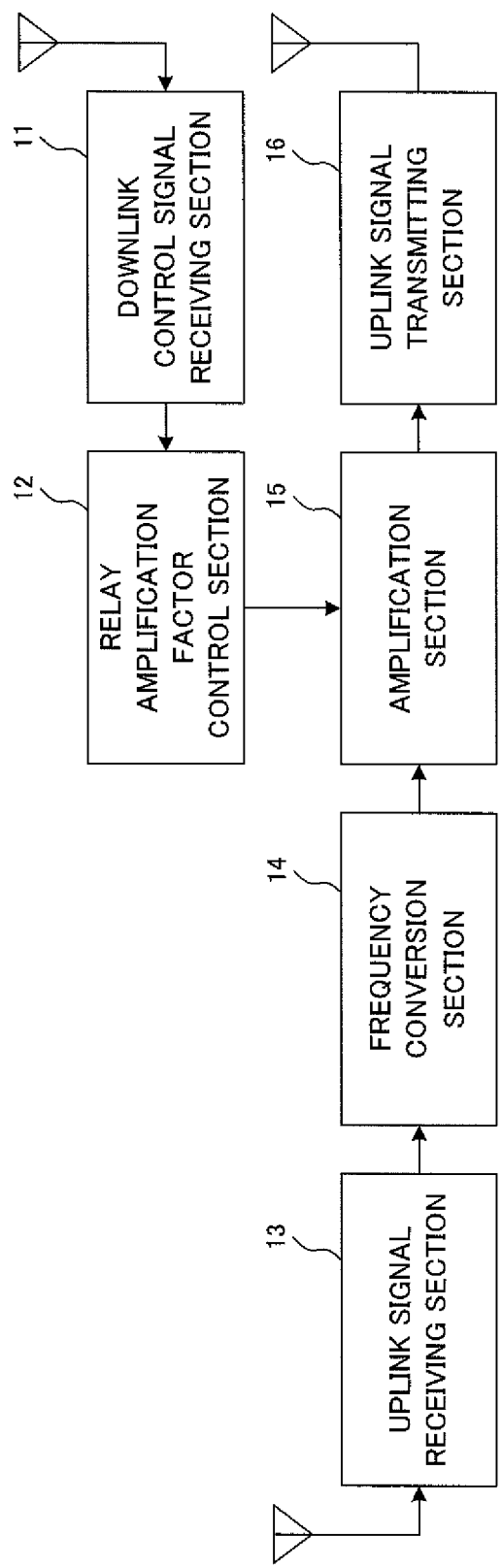
FIG. 4 is a diagram illustrating a configuration of a radio relay station apparatus according to an embodiment of the present invention.

FIG. 4 is a diagram illustrating a configuration of a radio relay station apparatus according to an embodiment of the present invention. The radio relay station apparatus shown in FIG. 4 is mainly constructed of a downlink control signal receiving section 11 that receives a downlink control signal from a radio base station apparatus, a relay amplification factor control section 12 that controls a relay amplification factor for a signal to be relayed, an uplink signal receiving section 13 that receives an uplink signal from a mobile terminal apparatus, a frequency conversion section 14 that converts, when the transmission frequency is different from the reception frequency, the frequency of the received signal to the frequency of the transmission signal, an amplification section 15 that amplifies the uplink signal to be relayed according to the relay amplification factor and an uplink signal transmitting section 16 that transmits an uplink signal to the radio base station apparatus.

The downlink control signal receiving section 11 receives a downlink control signal from the radio base station apparatus. This downlink control signal includes relay information as to whether or not the mobile terminal apparatus performs relay transmission. The downlink control signal also includes parameters to be used for the radio relay station apparatus power amplification factor control method, that is, parameters necessary for equation (1) and equation (2). The downlink control signal receiving section 11 demodulates the downlink control signal and acquires uplink scheduling information and relay information.

The relay amplification factor control section 12 controls the relay amplification factor when relaying the uplink signal based on the information obtained from the downlink control signal. That is, when the relay information is information indicating that the relay transmission is performed, the relay amplification factor control section 12 controls the relay amplification factor when performing the relay transmission. The relay amplification factor control section 12 controls the relay amplification factor when relaying an uplink signal using the RS-TPC method 1 or RS-TPC method 2.

In the case of the RS-TPC method 1, the relay amplification factor control section 12 controls the relay amplification factor so that the power density of the signal of the mobile terminal apparatus that performed relay transmission received at the radio base station apparatus via the radio relay station apparatus becomes substantially equal to that in the case where the mobile terminal apparatus exists at the position of the radio relay station apparatus and performs transmission without relay transmission. In this case, the relay amplification factor G is calculated by following equation (1).

$$G = T^{(no\ relay)} - T^{(relay)} + (1-\alpha^{(relay)})PL_{UE\text{-}RS} + \alpha^{(no\ relay)}PL_{RS\text{-}BS} \quad \text{Equation (1)}$$

where, $T^{(no\ relay)}$ is a reference target reception SNR when relay transmission is not performed, $T^{(relay)}$ is a reference target reception SNR when relay transmission is performed, $\alpha^{(relay)}$ is an attenuation coefficient of fractional TPC when relay transmission is performed, $\alpha^{(no\ relay)}$ is an attenuation coefficient of fractional TPC when relay transmission is not performed, $PL_{UE\text{-}RS}$ is path loss between the mobile terminal apparatus and the radio relay station apparatus, and $PL_{RS\text{-}BS}$ is path loss between the radio relay station apparatus and the radio base station apparatus.

On the other hand, in the case of the RS-TPC method 2, the relay amplification factor control section 12 controls the relay amplification factor so that the power density of the signal from the mobile terminal apparatus received at the radio base station apparatus via the radio relay station apparatus becomes substantially equal to that in the case where transmission is performed without relay transmission. In this case, the relay amplification factor G is calculated by following equation (2).

$$G = T^{(no\ relay)} - T^{(relay)} + (1-\alpha^{(relay)})PL_{UE\text{-}RS} - (1-\alpha^{(no\ relay)})PL_{UE\text{-}BS} + PL_{RS\text{-}BS} \quad \text{Equation (2)}$$

where, $T^{(no\ relay)}$ is a reference target reception SNR when relay transmission is not performed, $T^{(relay)}$ is a reference target reception SNR when relay transmission is performed, $\alpha^{(relay)}$ is an attenuation coefficient of fractional TPC when relay transmission is performed, $\alpha^{(no\ relay)}$ is an attenuation coefficient of fractional TPC when relay transmission is not performed, $PL_{UE-BS}$ is path loss between the mobile terminal apparatus and the radio base station apparatus, and $PL_{RS-BS}$ is path loss between the radio relay station apparatus and the radio base station apparatus.

The relay amplification factor control section 12 outputs information of the relay amplification factor to the amplification section 15. The amplification section 15 amplifies the uplink signal (uplink signal to be relayed) frequency-converted by the frequency conversion section 14 at the relay amplification factor received from the relay amplification factor control section 12.

The uplink signal receiving section 13 receives the uplink signal from the mobile terminal apparatus. The uplink signal receiving section 13 outputs the uplink signal to the frequency conversion section 14. The frequency conversion section 14 converts the frequency of the received signal to the frequency of the transmission signal. The frequency conversion section 14 outputs the frequency-converted uplink signal to the amplification section 15.

A case will be described here where the reception frequency is different from the transmission frequency of the radio relay station apparatus when relay is performed. The frequency conversion section 14 is unnecessary when the same frequency is used for the reception frequency and transmission frequency of the radio relay station apparatus, and time slots and/or codes are changed instead.

The uplink signal transmitting section 16 transmits the uplink signal amplified by the amplification section 15 at a relay amplification factor to the radio base station apparatus. That is, the uplink signal transmitting section 16 transmits the uplink signal amplified at a controlled relay amplification factor to the radio base station apparatus.

Figure 5:
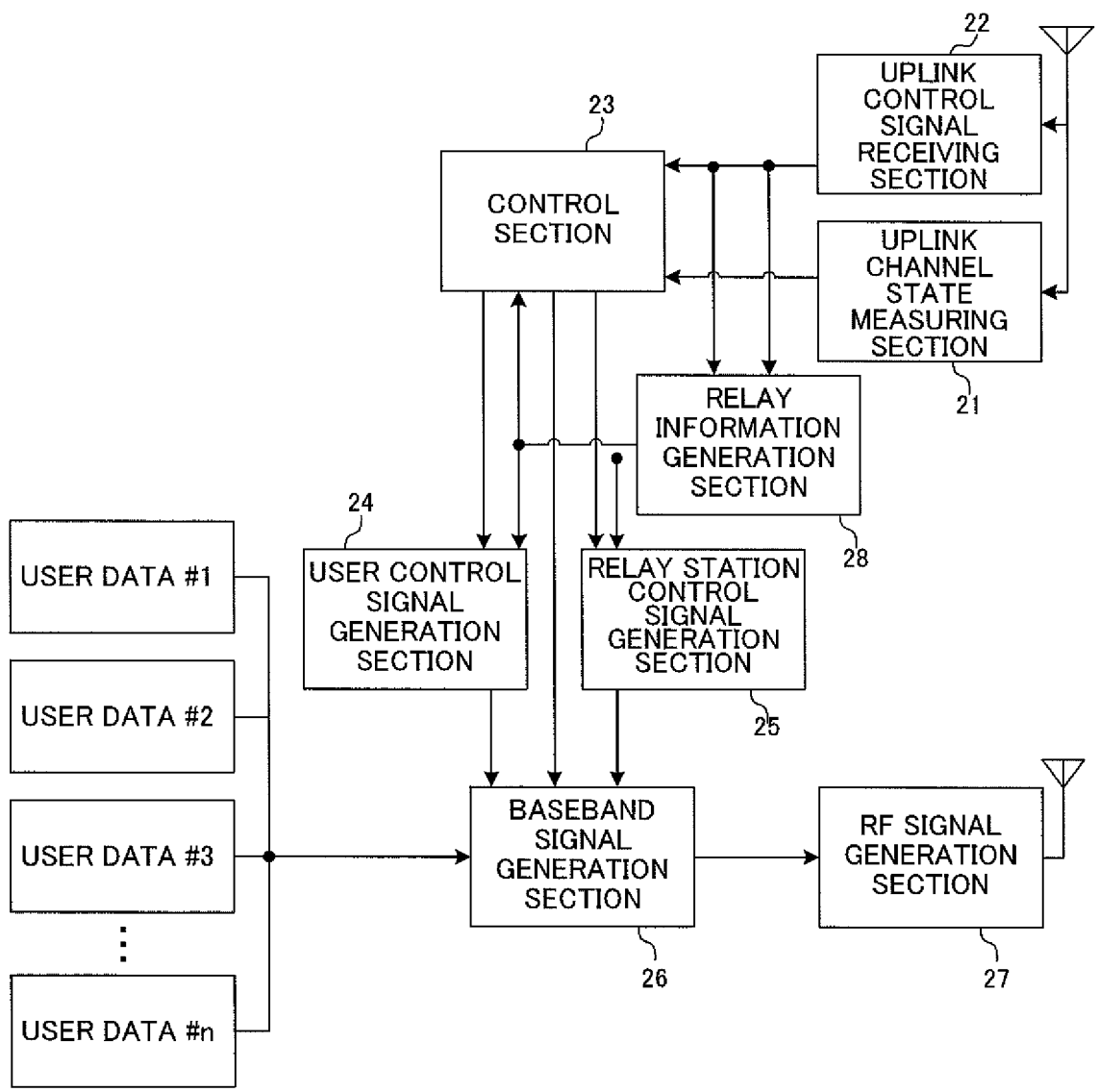
FIG. 5 is a diagram illustrating a configuration of a radio transmission base station apparatus according to the embodiment of the present invention.

FIG. 5 is a diagram illustrating a radio base station apparatus according to the embodiment of the present invention. The radio base station apparatus shown in FIGS is mainly constructed of an uplink channel state measuring section 21 that measures an uplink channel state, an uplink control signal receiving section 22 that receives an uplink control signal from the mobile terminal apparatus, a control section 23 that allocates radio resources, a user control signal generation section 24 that generates a control signal for the user, a relay station control signal generation section 25 that generates a control signal regarding relay information for the radio relay station apparatus, a baseband signal generation section 26 that generates a baseband signal including a control signal and user data, an RF signal generation section 27 that converts the baseband signal to a radio frequency signal and generates an RF signal, and a relay information generation section 28 that generates relay information for determining whether or not the mobile terminal apparatus performs relay transmission.

The uplink channel state measuring section 21 measures the uplink channel state using a reference signal transmitted from the mobile terminal apparatus. In an LTE system, a sounding reference signal (SRS) is used as this reference signal. The channel state means receiving quality such as SINR, Ec/No, RSRP (Reference Signal Received Power) of a reference signal. The uplink channel state measuring section 21 outputs information of the uplink channel state to the control section 23 and the relay information generation section 28.

The uplink control signal receiving section 22 receives an uplink control signal from each mobile terminal apparatus. The control signal includes, for example, a scheduling request (SR) and an amount indicating downlink receiving quality (CQI: Channel Quality Indicator). The uplink control signal receiving section 22 outputs an uplink control signal to the control section 23 and the relay information generation section 28.

The relay information generation section 28 generates relay information as to whether or not the mobile terminal apparatus performs relay transmission for each user based on receiving quality such as downlink CQI and/or uplink reception SINR. That is, the relay information generation section 28 determines relay information as to whether or not the mobile terminal apparatus performs relay transmission for each user. The relay information is reported to the control section 23 having a scheduler function, the user control signal generation section 24 and the relay station control signal generation section 25. When no uplink signal is relayed, the relay information may not necessarily be reported to the control section 23.

The relay station control signal generation section 25 generates a control signal regarding relay information for the radio relay station apparatus. Furthermore, the relay station control signal generation section 25 controls a relay amplification factor when relaying an uplink signal. That is, the relay station control signal generation section 25 controls the relay amplification factor when performing relay transmission. The relay station control signal generation section 25 controls the relay amplification factor when relaying the uplink signal using the RS-TPC method 1 or RS-TPC method 2.

In the case of the RS-TPC method 1, the relay station control signal generation section 25 controls the relay amplification factor so that the power density of a signal from the mobile terminal apparatus received at the radio base station apparatus via the radio relay station apparatus becomes substantially equal to that in the case where the mobile terminal apparatus exists at the position of the radio relay station apparatus and performs transmission without relay transmission. In this case, the relay amplification factor G is calculated by following equation (1).

$$G = T^{(no\ relay)} - T^{(relay)} + (1-\alpha^{(relay)})PL_{UE-RS} + \alpha^{(no\ relay)} PL_{RS-BS} \quad \text{Equation (1)}$$

where, $T^{(no\ relay)}$ is a reference target reception SNR when relay transmission is not performed, $T^{(relay)}$ is a reference target reception SNR when relay transmission is performed, $\alpha^{(relay)}$ is an attenuation coefficient of fractional TPC when relay transmission is performed, $\alpha^{(no\ relay)}$ is an attenuation coefficient of fractional TPC when relay transmission is not performed, $PL_{UE-RS}$ is path loss between the mobile terminal apparatus and the radio relay station apparatus, and $PL_{RS-BS}$ is path loss between the radio relay station apparatus and the radio base station apparatus.

On the other hand, in the case of the RS-TPC method 2, the relay station control signal generation section 25 controls the relay amplification factor so that the power density of a signal from the mobile terminal apparatus received at the radio base station apparatus via the radio relay station apparatus becomes substantially equal to that in the case where transmission is performed without relay transmission. In this case, the relay amplification factor G is calculated by following equation (2).

$$G = T^{(no\ relay)} - T^{(relay)} + (1-\alpha^{(relay)})PL_{UE-RS} - (1-\alpha^{(no\ relay)})PL_{UE-BS} + PL_{RS-BS} \quad \text{Equation (2)}$$

where, $T^{(no\ relay)}$ is a reference target reception SNR when relay transmission is not performed, $T^{(no\ relay)}$ is a reference target reception SNR when relay transmission is performed, $\alpha^{(relay)}$ is an attenuation coefficient of fractional TPC when relay transmission is performed, $\alpha^{(no\ relay)}$ is an attenuation coefficient of fractional TPC when relay transmission is not performed, $PL_{UE\text{-}BS}$ is path loss between the mobile terminal apparatus and the radio base station apparatus and $PL_{RS\text{-}BS}$ is path loss between the radio relay station apparatus and the radio base station apparatus.

Thus, when performing relay transmission, the relay station control signal generation section 25 determines the relay amplification factor to perform relay transmission. The relay station control signal generation section 25 generates information of the relay amplification factor obtained in this way as a relay station control signal and outputs the signal to the baseband signal generation section 26.

The control section 23 provided with a scheduler function performs scheduling and allocates uplink and downlink radio resources. The control section 23 outputs the uplink scheduling information and/or downlink scheduling information to the user control signal generation section 24.

The user control signal generation section 24 generates control information to be reported to each mobile terminal apparatus. This control information includes at least uplink scheduling information/downlink scheduling information and also includes relay information as required. The user control signal generation section 24 outputs a control signal to the baseband signal generation section 26.

The baseband signal generation section 26 generates a baseband signal including various kinds of control information and user data to be included in a downlink signal. The baseband signal generation section 26 outputs the generated baseband signal to the RF signal generation section 27. The RF signal generation section 27 converts the baseband signal to a transmission signal (RF signal) for radio transmission. Thus, the radio base station apparatus transmits relay information including information of the relay amplification factor to the radio relay station apparatus.

In the transmission power control method according to the present invention, the radio relay station apparatus receives a downlink signal including relay information as to whether or not the mobile terminal apparatus performs relay transmission, controls, when this relay information is information indicating that the relay transmission is performed, a relay amplification factor when performing the relay transmission and transmits an uplink signal amplified by the controlled relay amplification factor.

Furthermore, in the transmission power control method according to the present invention, the radio base station apparatus determines whether or not the mobile terminal apparatus performs relay transmission, and determines, when the relay transmission is performed, a relay amplification factor when performing the relay transmission and transmits relay information including information of this relay amplification factor to the radio relay station apparatus.

Thus, the transmission power control method according to the present invention includes mode 1 in which the radio relay station apparatus controls a relay amplification factor and mode 2 in which the radio base station apparatus controls a relay amplification factor. The respective modes include a method (RS-TPC method 1) whereby the relay amplification factor is controlled so that the power density of a signal from the mobile terminal apparatus received at the radio base station apparatus via the radio relay station apparatus becomes substantially equal to that in the case where the mobile terminal apparatus exists at the position of the radio relay station apparatus and performs transmission without relay transmission, and a method (RS-TPC method 2) whereby the relay amplification factor is controlled so that the power density of a signal from the mobile terminal apparatus received at the radio base station apparatus via the radio relay station apparatus becomes substantially equal to that in the case where transmission is performed without relay transmission. In the RS-TPC method 1, a signal from a mobile terminal apparatus located at a cell edge is received by the radio base station apparatus with greater receiving power than that when the radio relay station apparatus is not used, and it is thereby possible to improve user throughput. In the RS-TPC method 2, although the receiving power in the radio base station apparatus is basically not different from that in the case where the radio relay station apparatus is not used, it is possible to reduce the transmission power of the mobile terminal apparatus and radio relay station apparatus, thereby reduce interference with periphery and consequently improve user throughput.

According to the present invention, user throughput characteristics can be improved in four modes (mode 1/RS-TPC method 1, mode 2/RS-TPC method 1, mode 1/RS-TPC method 2, mode 2/RS-TPC method 2).

Figure 6:
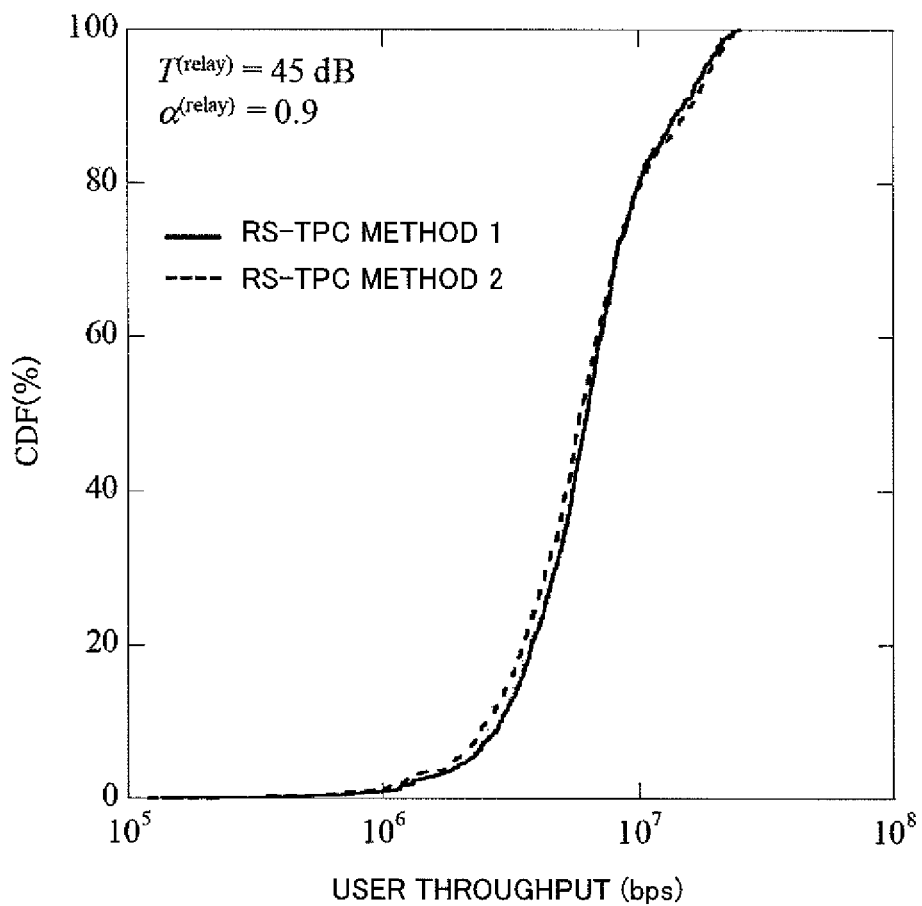
FIG. 6 is a diagram illustrating a cumulative distribution of user throughput.

Next, evaluation of user throughput to make clear the effects of the present invention will be described. FIG. 6 is a diagram illustrating a cumulative probability distribution of user throughput in the case where the RS-TPC method 1 and RS-TPC method 2 are used. It is assumed here that $T^{(relay)}$ is 45 dB and $\alpha^{(relay)}$ is 0.9. As is clear from FIG. 6, there is an overall tendency that the spread of user throughput distribution of the RS-TPC method 1 is narrower than that of the RS-TPC method 2. This may be attributable to the fact that the RS-TPC method 1 controls the signal power of the mobile terminal apparatus received at the radio base station apparatus during relay transmission so as to be substantially equal to that in the case where the mobile terminal apparatus exists at the position of the radio relay station apparatus, causing the received signal power of the mobile terminal apparatus located at the cell edge to increase, resulting in an increase of throughput of the mobile terminal apparatus, whereas interference caused by transmission of the mobile terminal apparatus located at the cell edge increases, causing throughput of the mobile terminal apparatus in the vicinity of the cell to deteriorate. On the other hand, the RS-TPC method 2 performs control so as to realize signal power received at the radio base station apparatus obtained without relay transmission while reducing the sum of the amount of interference caused by transmission of the mobile terminal apparatus and transmission of the radio relay station apparatus through the relay of the radio relay station apparatus, and thereby increases variations in user throughput in the cell. Here, user throughput at the cell edge was evaluated by defining it as a value at a point at which the cumulative probability is 5%.

Figure 7:
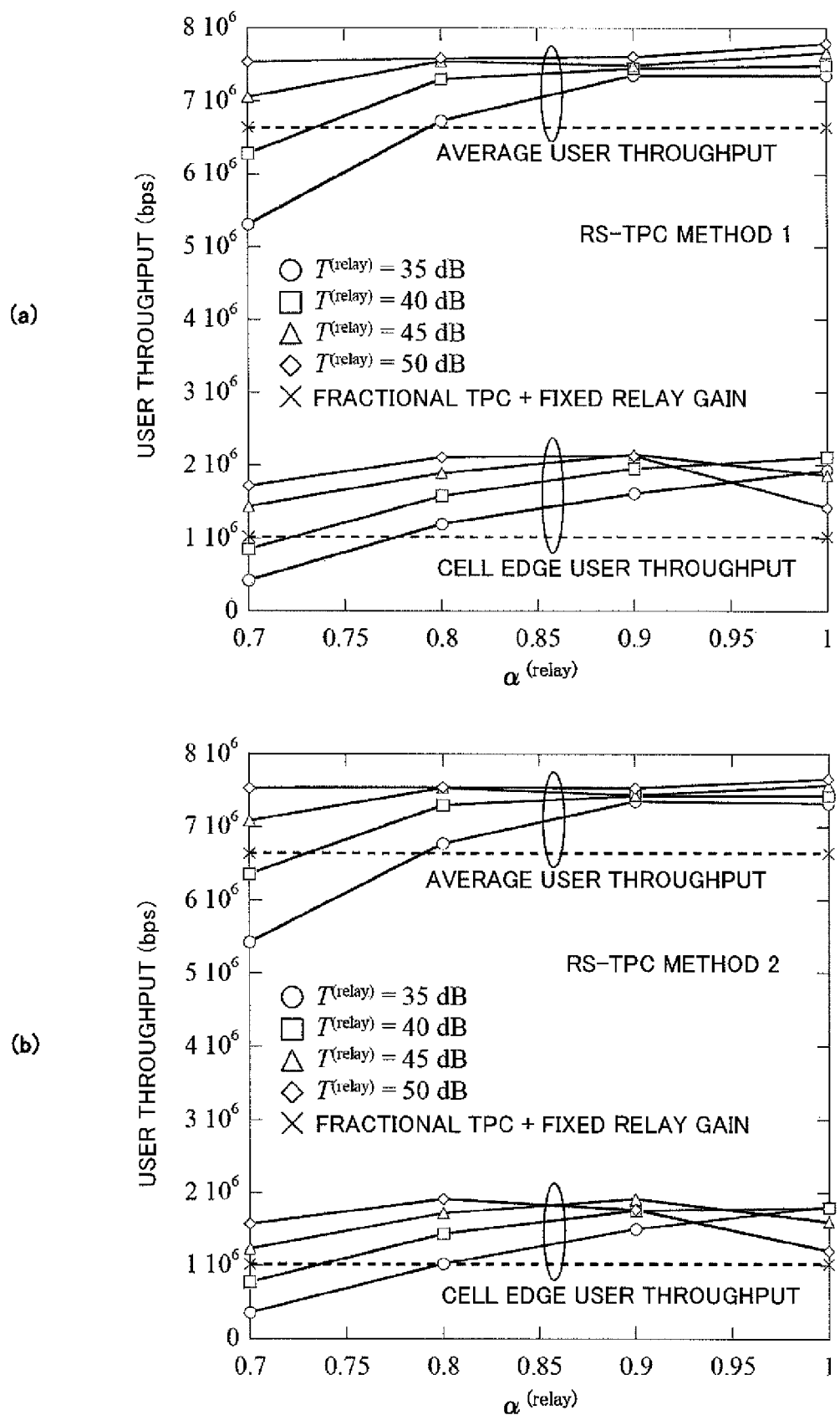
FIGS. 7(a) and (b) are diagrams illustrating user throughput of the transmission power control method according to the embodiment of the present invention.

FIGS. 7(*a*) and (*b*) are diagrams illustrating average user throughput and cell edge user throughput with respect to $\alpha^{(relay)}$ when using the RS-TPC method 1 and RS-TPC method 2 respectively. Here, user throughput was evaluated by changing $T^{(relay)}$ from 35 dB to 50 dB. Furthermore, results are also shown for a comparison in the case where the mobile terminal apparatus controls the transmission power density according to fractional TPC in equation (5) irrespective of the presence/absence of relay transmission and performs relay transmission and the radio relay station apparatus amplifies and transfers the signal at a fixed power amplification factor. In this case, the fixed power amplification factor is defined so that the cell edge user throughput is maximized. As is clear from FIG. 7, both the RS-TPC method 1 and RS-TPC method 2 increase both the cell edge user throughput and the average user throughput compared to the case where the fixed power amplification factor is used.

This may be because it is possible to suppress the amount of interference by setting appropriate transmission power according to the path loss of each link. In the present invention, when $\alpha^{(relay)}$ is increased from 0.7, the transmission power of the mobile terminal apparatus increases, and therefore the power amplification factor in the radio relay station apparatus can be suppressed to a low level. As a result, other cell interference amplified and transferred from the radio relay station apparatus decreases, and therefore the cell edge user throughput and the average user throughput increase. However, when $\alpha^{(relay)}$ is increased excessively, the amount of inter-cell interference directly caused by transmission of the mobile terminal apparatus increases, and therefore there is a tendency that user throughput deteriorates. This tendency is particularly noticeable under a condition under which $T^{(relay)}$ is large.

When user throughputs in FIGS. 7(a) and (b) are compared, the RS-TPC method 1 realizes the average user throughput substantially identical to that of the RS-TPC method 2, whereas the cell edge user throughput is slightly improved. This may be attributable to the fact that the effect of positively increasing received signal power of the cell edge user in the RS-TPC method 1 exceeds influences of the other cell interference amplification at the radio relay station apparatus that occurs simultaneously.

As described above, according to the transmission power control method of the present invention, the radio relay station apparatus requires information of average path loss between the mobile terminal apparatus and the radio relay station apparatus, between the radio relay station apparatus and the radio base station apparatus, and between the mobile terminal apparatus and the radio base station apparatus, but can realize cell edge user throughput on the order of twice that in the case where the radio relay station apparatus performs relay transfer at a fixed power amplification factor, under a condition with the same cell average user throughput.

The present invention is not limited to the above-described embodiment, but can be implemented modified in various ways. The number of processing sections and processing procedure in the above description may be implemented modified in various ways as appropriate without departing from the scope of the present invention. Furthermore, each element illustrated in the drawings represents a function and each function block may be implemented by hardware or may also be implemented by software. Other aspects of the present invention may be implemented modified as appropriate without departing from the scope of the present invention.

Industrial Applicability

The present invention is useful for a radio relay station apparatus, a radio base station apparatus and a transmission power control method in an LTE system and LTE-Advanced which is an advanced type of the LTE system.

The present application is based on Japanese Patent Application No. 2010-004878 filed on Jan. 13, 2010, entire content of which is expressly incorporated by reference herein.

The invention claimed is:

1. A radio relay station apparatus comprising:
receiving section configured to receive a downlink signal including relay information as to whether or not a mobile terminal apparatus performs relay transmission;
relay amplification factor control section configured to control a relay amplification factor when performing the relay transmission when the relay information is information indicating that the relay transmission is performed; and
transmitting section configured to transmit an uplink signal amplified at the controlled relay amplification factor, wherein:
the relay amplification factor control section controls the relay amplification factor so that a power density of a signal from the mobile terminal apparatus received at a radio base station apparatus via the radio relay station apparatus becomes substantially equal to a case where the mobile terminal apparatus exists at a position of the radio relay station apparatus and performs transmission without relay transmission.

2. The radio relay station apparatus according to claim 1, wherein the relay amplification factor G is calculated by following equation (1):

$$G = T^{(no\ relay)} - T^{(relay)} + (1 - \alpha^{(relay)})PL_{UE-RS} + \alpha^{(no\ relay)} PL_{RS-BS} \quad \text{Equation (1)}$$

where, $T^{(no\ relay)}$ is a reference target reception SNR when relay transmission is not performed, $T^{(relay)}$ is a reference target reception SNR when relay transmission is performed, $\alpha^{(relay)}$ is an attenuation coefficient of fractional TPC when relay transmission is performed, $\alpha^{(no\ relay)}$ is an attenuation coefficient of fractional TPC when relay transmission is not performed, $PL_{UE-RS}$ is path loss between the mobile terminal apparatus and the radio relay station apparatus, and $PL_{RS-BS}$ is path loss between the radio relay station apparatus and the radio base station apparatus.

3. A radio relay station apparatus comprising:
receiving section configured to receive a downlink signal including relay information as to whether or not a mobile terminal apparatus performs relay transmission;
relay amplification factor control section configured to control a relay amplification factor when performing the relay transmission when the relay information is information indicating that the relay transmission is performed; and
transmitting section configured to transmit an uplink signal amplified at the controlled relay amplification factor, wherein:
the relay amplification factor control section controls the relay amplification factor so that a power density of a signal from the mobile terminal apparatus received at a radio base station apparatus via the radio relay station apparatus becomes substantially equal to a case where transmission is performed without relay transmission, and
the relay amplification factor G is calculated by following equation (2):

$$G = T^{(no\ relay)} - T^{(relay)} + (1 - \alpha^{(relay)})PL_{UE-RS} - (1 - \alpha^{(no\ relay)})PL_{UE-BS} + PL_{RS-BS} \quad \text{Equation (2)}$$

where, $T^{(no\ relay)}$ is a reference target reception SNR when relay transmission is not performed, $T^{(relay)}$ is a reference target reception SNR when relay transmission is performed, $\alpha^{(relay)}$ is an attenuation coefficient of the fractional TPC when relay transmission is performed, $\alpha^{(no\ relay)}$ is an attenuation coefficient of fractional TPC when relay transmission is not performed, $PL_{UE-BS}$ is path loss between the mobile terminal apparatus and the radio base station apparatus and $PL_{RS-BS}$ is path loss between the radio relay station apparatus and the radio base station apparatus.

4. A radio base station apparatus comprising:
relay information generating section configured to determine whether or not a mobile terminal apparatus performs relay transmission;

relay station control signal generating section configured to determine, a relay amplification factor when performing the relay transmission when the relay transmission is performed; and transmitting section configured to transmit relay information including information of the relay amplification factor to a radio relay station apparatus, wherein:

the relay station control signal generating section determines the relay amplification factor so that a power density of a signal from the mobile terminal apparatus received at a radio base station apparatus via the radio relay station apparatus becomes substantially equal to a case where the mobile terminal apparatus exists at a position of the radio relay station apparatus and performs transmission without relay transmission.

5. The radio base station apparatus according to claim 4, wherein the relay amplification factor G is calculated by following equation (1):

$$G = T^{(no\ relay)} - T^{(relay)} + (1-\alpha^{(relay)})PL_{UE\text{-}RS} + \alpha^{(no\ relay)} PL_{RS\text{-}BS} \quad \text{Equation (1)}$$

where, $T^{(no\ relay)}$ is a reference target reception SNR when relay transmission is not performed, $T^{(relay)}$ is a reference target reception SNR when relay transmission is performed, $\alpha^{(relay)}$ is an attenuation coefficient of fractional TPC when relay transmission is performed, $\alpha^{(no\ relay)}$ is an attenuation coefficient of fractional TPC when relay transmission is not performed, $PL_{UE\text{-}RS}$ is path loss between the mobile terminal apparatus and the radio relay station apparatus, and $PL_{RS\text{-}BS}$ is path loss between the radio relay station apparatus and the radio base station apparatus.

6. A radio base station apparatus comprising:

relay information generating section configured to determine whether or not a mobile terminal apparatus performs relay transmission;

relay station control signal generating section configured to determine, a relay amplification factor when performing the relay transmission when relay transmission is performed; and transmitting section configured to transmit relay information including information of the relay amplification factor to a radio relay station apparatus, wherein:

the relay station control signal generating section controls the relay amplification factor so that a power density of a signal from the mobile terminal apparatus received at a radio base station apparatus via a radio relay station apparatus becomes substantially equal to a case where transmission is performed without relay transmission, and the relay amplification factor G is calculated by following equation (2):

$$G = T^{(no\ relay)} - T^{(relay)} + (1-\alpha^{(relay)}) PL_{UE\text{-}RS} + (1\alpha^{(no\ relay)}) PL_{RS\text{-}BS} + PL_{RS\text{-}BS} \quad \text{Equation (2)}$$

where, $T^{(no\ relay)}$ is a reference target reception SNR when relay transmission is not performed, $T^{(relay)}$ is a reference target reception SNR when relay transmission is performed, $\alpha^{(relay)}$ is an attenuation coefficient of the fractional TPC when relay transmission is performed, $\alpha^{(no\ relay)}$ is an attenuation coefficient of fractional TPC when relay transmission is not performed, $PL_{UE\text{-}BS}$ is path loss between the mobile terminal apparatus and the radio relay station apparatus, and $PL_{RS\text{-}BS}$ is path loss between the radio relay station apparatus and the radio base station apparatus.

7. A transmission power control method comprising the steps of:

receiving a downlink signal including relay information as to whether or not a mobile terminal apparatus performs relay transmission;

controlling, a relay amplification factor when performing the relay transmission when relay transmission is performed; and transmitting an uplink signal amplified at the controlled relay amplification factor, wherein:

the relay amplification factor is controlled so that a power density of a signal from the mobile terminal apparatus received at a radio base station apparatus via a radio relay station apparatus becomes substantially equal to a case where the mobile terminal apparatus exists at the position of the radio relay station apparatus and performs transmission without relay transmission.

8. A transmission power control method comprising the steps of:

receiving a downlink signal including relay information as to whether or not a mobile terminal apparatus performs relay transmission;

controlling, a relay amplification factor when performing the relay transmission when relay transmission is performed; and transmitting an uplink signal amplified at the controlled relay amplification factor, wherein:

the relay amplification factor is controlled so that a power density of a signal from the mobile terminal apparatus received at a radio base station apparatus via a radio relay station apparatus becomes substantially equal to a case where transmission is performed without relay transmission, and the relay amplification factor G is calculated by following equation (2):

$$G = T^{(no\ relay)} - T^{(relay)} + (1-\alpha^{(relay)}) PL_{UE\text{-}RS} + (1\alpha^{(no\ relay)}) PL_{UE\text{-}BS} + PL_{RS\text{-}BS} \quad \text{Equation (2)}$$

where, $T^{(no\ relay)}$ is a reference target reception SNR when relay transmission is not performed, $T^{(relay)}$ is a reference target reception SNR when relay transmission is performed, $\alpha^{(relay)}$ is an attenuation coefficient of the fractional TPC when relay transmission is performed, $\alpha^{(no\ relay)}$ is an attenuation coefficient of fractional TPC when relay transmission is not performed, $PL_{UE\text{-}BS}$ is path loss between the mobile terminal apparatus and the radio base station apparatus and $PL_{RS\text{-}BS}$ is path loss between the radio relay station apparatus and the radio base station apparatus.

\* \* \* \* \*